(12) United States Patent
Bourdelais et al.

(10) Patent No.: US 7,397,466 B2
(45) Date of Patent: Jul. 8, 2008

(54) INTEGRAL SPACER DOTS FOR TOUCH SCREEN

(75) Inventors: Robert P. Bourdelais, Pittsford, NY (US); Cheryl J. Brickey, Webster, NY (US); Gerald T. Hertzel, Rochester, NY (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 736 days.

(21) Appl. No.: 10/987,467

(22) Filed: Nov. 12, 2004

(65) Prior Publication Data

US 2006/0103632 A1 May 18, 2006

(51) Int. Cl.
*G06F 3/041* (2006.01)
*G06F 3/045* (2006.01)
*H01H 1/10* (2006.01)

(52) U.S. Cl. ............... 345/173; 178/18.01; 200/512
(58) Field of Classification Search ................. 345/168, 345/173–176; 178/18.1–18.11; 200/511–516, 200/600
See application file for complete search history.

(56) References Cited

U.S. PATENT DOCUMENTS

| 4,220,815 | A | | 9/1980 | Gibson et al. |
| 5,062,198 | A | | 11/1991 | Sun |
| 5,955,198 | A | * | 9/1999 | Hashimoto et al. ....... 178/18.03 |
| 6,074,192 | A | | 6/2000 | Mikkelsen |
| 6,706,552 | B2 | * | 3/2004 | Getz et al. ................. 438/100 |
| 2002/0094660 | A1 | | 7/2002 | Getz et al. |
| 2003/0141118 | A1 | | 7/2003 | Kakuno |
| 2004/0090426 | A1 | | 5/2004 | Bourdelais et al. |
| 2004/0135775 | A1 | | 7/2004 | Hurst et al. |
| 2005/0269742 | A1 | | 12/2005 | Wright et al. |
| 2006/0102452 | A1 | | 5/2006 | Cok et al. |
| 2006/0102460 | A1 | | 5/2006 | Bourdelais et al. |
| 2006/0102461 | A1 | | 5/2006 | Cok et al. |
| 2006/0102462 | A1 | | 5/2006 | Bourdelais et al. |
| 2006/0102463 | A1 | | 5/2006 | Cok |
| 2006/0105146 | A1 | | 5/2006 | Bourdelais et al. |
| 2006/0105148 | A1 | | 5/2006 | Cok et al. |
| 2006/0105152 | A1 | * | 5/2006 | Cok et al. ................. 428/209 |

FOREIGN PATENT DOCUMENTS

EP       1 471 415      10/2004

* cited by examiner

*Primary Examiner*—David L. Lewis
(74) *Attorney, Agent, or Firm*—Andrew J. Anderson

(57) ABSTRACT

A touch screen comprising a flexible sheet comprising a substantially planar surface and integral compressible spacer dots formed thereon, where each spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, and wherein the surface of the spacer dot extending above the base cross section is not equidistant from the mid-point of the axis between the intersections of the first and second points or sets of connected points and the axis.

43 Claims, 7 Drawing Sheets

 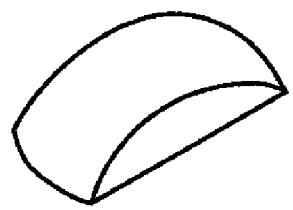 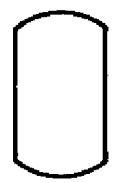
FIG. 12a  FIG. 12b  FIG. 12c
  
FIG. 13a  FIG. 13b  FIG. 13c
  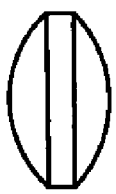
FIG. 14a  FIG. 14b  FIG. 14c

INTEGRAL SPACER DOTS FOR TOUCH SCREEN

FIELD OF THE INVENTION

This invention relates to touch screens and more particularly, to a flexible cover sheet and spacer dots separating the cover sheet from a substrate in a resistive touch screen.

BACKGROUND OF THE INVENTION

Resistive touch screens are widely used in conventional CRTs and in flat-panel display devices in computers and in particular with portable computers.

FIG. 3 shows a portion of a prior art resistive touch screen 10 of the type shown in Published U.S. patent application Ser. No. 2002/0094660A1, filed by Getz et al., Sep. 17, 2001, and published Jul. 18, 2002, which includes a substrate 12, having a first conductive layer 14. A flexible cover sheet 16 includes a second conductive layer 18 that is physically separated from the first conductive layer 14 by spacer dots 20 formed on the second conductive layer 18 by screen printing.

Referring to FIG. 4, when the flexible cover sheet 16 is deformed, for example by finger 13 pressure, to cause the first and second conductive layers to come into electrical contact, a voltage applied across the conductive layers 14 and 18 results in a flow of current proportional to the location of the contact. The conductive layers 14 and 18 have a resistance selected to optimize power usage and position sensing accuracy. The magnitude of this current is measured through connectors (not shown) connected to metal conductive patterns (not shown) formed on the edges of conductive layers 18 and 14 to locate the position of the deforming object.

Alternatively, it is known to form the spacer dots 20 for example by spraying through a mask or pneumatically sputtering small diameter transparent glass or polymer particles, as described in U.S. Pat. No. 5,062,198 issued to Sun, Nov. 5, 1991. The transparent glass or polymer particles are typically 45 microns in diameter or less and mixed with a transparent polymer adhesive in a volatile solvent before application. This process is relatively complex and expensive and the use of an additional material such as an adhesive can be expected to diminish the clarity of the touch screen. Such prior art spacer dots are limited in materials selections to polymers that can be manufactured into small beads or UV coated from monomers.

It is also known to use photolithography to form the spacer dots 20. In these prior art methods, the spacer dots may come loose and move around within the device, thereby causing unintended or inconsistent actuations. Furthermore, contact between the conductive layers 14 and 18 is not possible where the spacer dots are located, thereby reducing the accuracy of the touch screen, and stress at the locations of the spacer dots can cause device failure after a number of actuations. Unless steps are taken to adjust the index of refraction of the spacer dots, they can also be visible to a user, thereby reducing the quality of a display located behind the touch screen.

U.S. Pat. No. 4,220,815 (Gibson et al.) and U.S. patent application US20040090426 (Bourdelais et al.) disclose integral spacer dots on flexible cover sheets for touch screen applications. It would be desirable to improve such integral spacer dot systems for separating the conductive layers of a touch screen in order to improve the robustness of the touch screen and reduces the cost of manufacture. It would be further desirable to provide uniquely shaped spacer dots that may be formed in a preset pattern efficiently.

SUMMARY OF THE INVENTION

In one embodiment, the invention is directed towards a touch screen comprising: a) a substrate; b) a first conductive layer located on the substrate; c) a flexible sheet comprising a substantially planar surface and integral compressible spacer dots formed thereon, each integral compressible spacer dot having a base closest to the substantially planar surface and a peak furthest from the substantially planar surface; and d) a second conductive layer located on the substantially planar surface of the flexible sheet, the peaks of the integral compressible spacer dots extending beyond the second conductive layer located on the substantially planar surface; wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, and further wherein each integral compressible spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, the height increasing from the first point or set of connected points intersecting the axis to an intermediate point along the axis and decreasing from an intermediate point along the axis to the second point or set of connected points intersecting the axis, and wherein the surface of the spacer dot extending above the base cross section is not equidistant from the mid-point of the axis between the intersections of the first and second points or sets of connected points and the axis.

In a further embodiment, the invention is directed towards a method of making a resistive touch screen, comprising the steps of: a) providing a substrate; b) forming a first conductive layer on the substrate; c) providing a flexible cover sheet comprising a substantially planar surface and integral compressible spacer dots formed thereon, each integral compressible spacer dot having a base closest to the substantially planar surface and a peak furthest from the substantially planar surface; d) forming a second conductive layer on the substantially planar surface of the flexible cover sheet, where the peaks of the integral compressible spacer dots extend beyond the second conductive layer formed on the substantially planar surface; and e) locating the flexible cover sheet over the substrate such the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, wherein each integral compressible spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, the height increasing from the first point or set of connected points intersecting the axis to an intermediate point along the axis and decreasing from an intermediate point along the axis to the second point or set of connected points intersecting the axis, and wherein the surface of the spacer dot extending above the base cross section is not equidistant from the mid-point of the axis between the intersections of the first and second points or sets of connected points and the axis.

ADVANTAGEOUS EFFECT OF THE INVENTION

The touch screen of the present invention has the advantages that it is simple to manufacture, and provides greater accuracy, robustness and clarity.

BRIEF DESCRIPTION OF THE DRAWINGS

FIG. 12a-c represent cross-sectional, perspective, and top views of a spacer dot molded from a cavity formed with a stylus in accordance with an embodiment of the invention;

FIG. 13a-c represent cross-sectional, perspective, and top views of a spacer dot molded from a cavity formed with a stylus in accordance with an embodiment of the invention; and FIG. 14a-c represent cross-sectional, perspective, and top views of a spacer dot molded from a cavity formed with a stylus in accordance with an embodiment of the invention.

DETAILED DESCRIPTION OF THE INVENTION

Figure 1:
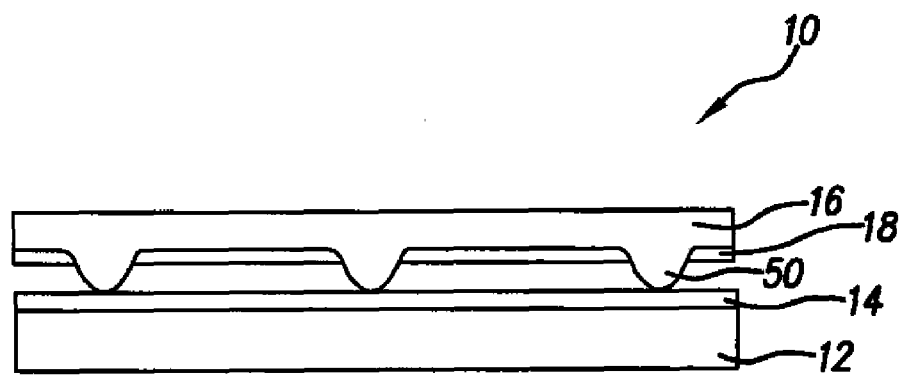
FIG. 1 is a schematic diagram showing a portion of a touch screen according to the present invention.

Referring to FIG. 1, the problems of the prior art resistive touch screens are overcome through the use of a flexible cover sheet 16 having a second conductive layer 18 and integral compressible spacer dots 50 formed in the flexible cover sheet 16, where the flexible cover sheet 16 is located over a substrate 12 having a first conductive layer 14. Flexible cover sheet 16 comprises a substantially planar surface and the integral compressible spacer dots 50 are formed thereon, each integral compressible spacer dot having a base closest to the substantially planar surface and a peak furthest from the substantially planar surface. Second conductive layer 18 is deposited over the flexible cover sheet 16 between the spacer dots 50, and preferably does not cover the peaks of the spacer dots 50. Alternatively, if conductive material from layer 18 is formed on the peaks of the dots 50, it may be electrically isolated from the conductive layer 18 formed on the substantially planar surface portion of flexible sheet 16. When a force is applied to the flexible cover sheet 16 at the location of one of the integral compressible spacer dots 50, the integral compressible spacer dot is compressed to allow electrical contact between the first and second conductive layers. The word "integral" means that the compressible spacer dots 50 are formed in and comprise the same material as the flexible cover sheet 16 for example by molding or embossing. In FIG. 1, the spacer dots are shown as equal shape and spacing, but may vary according to the invention.

In the absence of an applied compressive force, the peaks of the integral compressible spacer dots 50 extend beyond the second conductive layer 18 located on the substantially planar surface area of the flexible cover sheet 16, and prevent the second conductive layer on the substantially planar surface from touching the first conductive layer 14 on the substrate 12. Because the peaks of integral compressible spacer dots 50 are not coated with the second conductive layer 18 (or conductive material coated on such peaks is not in electrical contact with the second conductive layer 18 deposited on the substantially planar surface between the spacer dots), and because the integral compressible spacer dots 50 physically separate the conductive layer 18 deposited on the substantially planar surface from conductive layer 14, no-current can flow between the conductive layers. While the various layers of the touch screen may be transparent or not for different applications, in a preferred embodiment each of the substrate, first conductive layer, flexible cover sheet, and second conductive layer are transparent to allow use in combination with displays or area illuminators (lamps).

Figure 2:
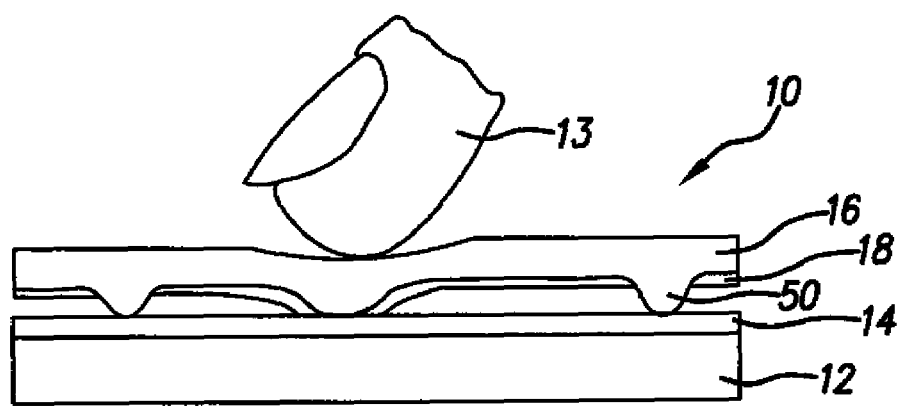
FIG. 2 is a schematic diagram illustrating the operation of the touch screen shown in FIG. 1.
Figure 3:
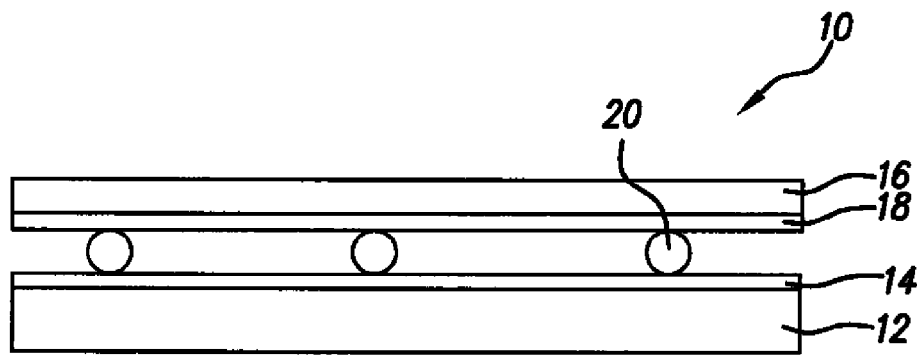
FIG. 3 is a schematic diagram showing a portion of a prior art touch screen.
Figure 4:
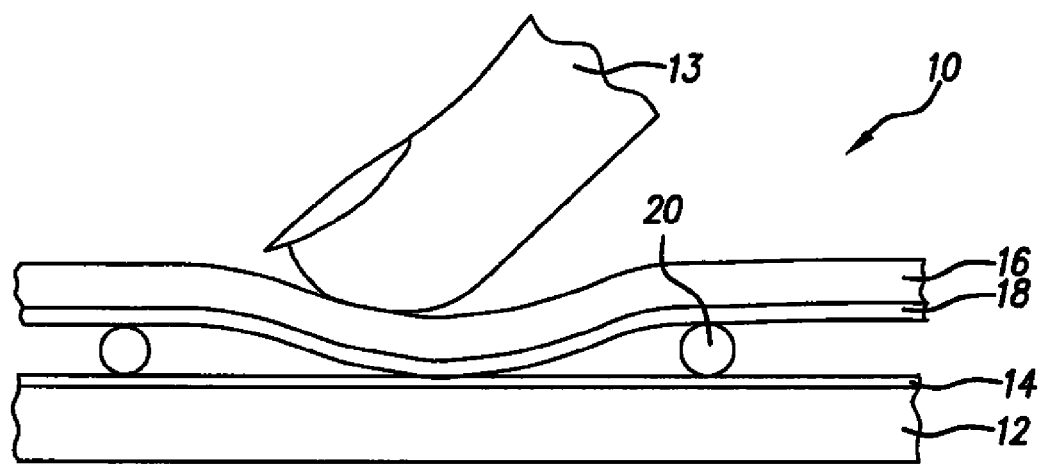
FIG. 4 is a schematic diagram illustrating the operation of the touch screen of FIG. 3.

Referring to FIG. 2, in operation, when an external object such as a finger 13 or stylus deforms the flexible cover sheet 16, the flexible cover sheet 16 is pressed against the substrate 12 thereby causing the conductive layers 14 and 18 to touch and close a circuit. Substrate 12 itself may be rigid or flexible. If the substrate is flexible, however, it should be less flexible than the cover sheet, or mounted upon a surface that is less flexible than the cover sheet. If the deformation occurs on one of the integral compressible spacer dots 50, the spacer dot is compressed so that contact is made between conductive layers 14 and 18 and current can flow between the conductive layers. Since the stylus or finger 13 is typically larger than the integral compressible spacer dot 50, the lack of conductive material 18 at the top of the integral compressible spacer dots 50 does not inhibit the conductive layers 14 and 18 from touching. If the deformation does not occur on one of the integral compressible spacer dots 50, the contact is made between conductive layers 14 and 18 without necessarily compressing a spacer dot.

Because the integral compressible spacer dots 50 are an integral part of the flexible cover sheet 16, they are fixed in position and cannot move or come loose as can spacer dots composed of beads in an adhesive matrix, or dots that are formed by printing or photolithography. In particular, in the case of use of a flexible substrate 12, as the substrate 12 is flexed, the integral spacer dots 50 are not likely to be broken loose from the flexible cover sheet 16. Moreover, the integral spacer dots can be smaller than conventional spacer dots (e.g. as small as 1 micron in diameter, usually 10 to 50 microns). Additional materials, such as adhesives, are unnecessary, thereby reducing manufacturing materials and steps and further improving the optical clarity of the device. Indeed, because the integral compressible spacer dots 50 are integral to the flexible cover sheet 16, as a flexible substrate 12 and flexible cover 16 are flexed, the integral compressible spacer dots 50 are flexed with them, thus maintaining the separation between the substrate 12 and cover sheet 16. The number of integral compressible spacer dots 50 may be increased to further enhance the robustness of the touch screen.

There are several possible methods for creating the compressible spacer dots integral to the flexible cover sheet. A first is to take an existing, formed flexible cover sheet with no spacer dots and emboss spacer dots in the flexible cover sheet by applying heat and pressure to the flexible cover sheet in a mold that defines a reverse image of the spacer dots. The heat and pressure reforms the flexible cover sheet so that the flexible cover sheet will have integral compressible spacer dots when the mold is removed. Such a mold can be, for example, a cylinder that rolls over a continuous sheet of flexible cover sheet material. In another method, melted polymer may be coated over the mold and forced into the cavities (for example by extrusion roll molding), allowed to cool, and then lifted from the mold. The molding process may be continuous roll molding. An oriented polymer may also be brought into the nip between he patterned roller and a pressure roller so that the spacer dots are created on top of an oriented polymer film. Other methods to create the spacer dots include vacuum forming around a pattern, extrusion roll molding the pattern, and using UV curable materials coated in a mold and then cured.

In accordance with the present invention, the integral compressible spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, the height increasing from the first point or set of connected points intersecting the axis to an intermediate point along the axis and decreasing from an intermediate point along the axis to the second point or set of connected points intersecting the axis, and wherein the surface of the spacer dot extending above the base cross section is not equidistant from the mid-point of the axis between the intersections of the first and second points or sets of connected points and the axis.

Figure 10:
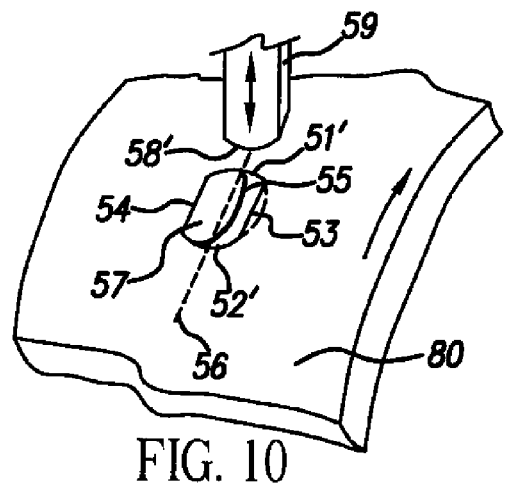
FIGS. 10 and 11 are schematic diagrams illustrating formation of mold cavities for formation of integral spacer dots in accordance with embodiments of the present invention.
Figure 11:
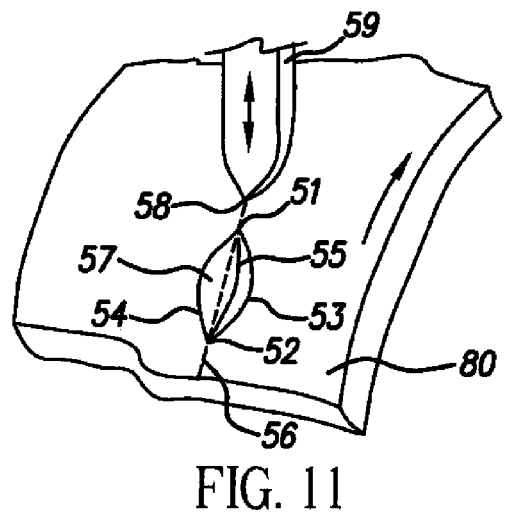

Spacer dot shapes in accordance with the present invention result from use of a correspondingly shaped mold pattern that may be obtained by forming spacer dot shaped depressions on a mold plate or cylinder by bringing a cutting stylus into contact with the outer surface of the plate or cylinder as they are moved past each other in relative movement. Referring to FIGS. 10 and 11, e.g., cavity 57 may be formed by relative translational movement and contact of stylus 59 with mold 80. The periphery of cavity 57 formed in the surface of mold 80 (and corresponding base cross section of an integral spacer dot formed with such a mold on a substantially planar surface of a flexible sheet) is defined by a first point 51 or set of connected points 51' intersecting an axis 56 in the substantially planar surface of mold 80, a second opposed point 52 or set of connected points 52' intersecting the axis, and first and second continuous edge segments 53 and 54 connecting the first and second points 51, 52 or end points of the first and second sets of points 51', 52' on opposite sides of the axis. The cavity 57 has a variable depth (and the corresponding integral spacer dot formed in such cavity will have a variable height) perpendicular to the substantially planar surface of the mold along the axis 56, the depth increasing from the first point 51 or set of connected points 51' intersecting the axis to an intermediate point along the axis and decreasing from an intermediate point along the axis to the second point 52 or set of connected points 52' intersecting the axis. First point 51 or set of connected points 51' of the cavity periphery will correspond to the shape of the edge of the stylus 59 which makes initial contact with the surface of mold 80 as they are brought into contact with relative movement, such as point 58 or leading edge 58', while second opposed point 52 or set of connected points 52' of the cavity periphery will correspond to the shape of the stylus in final contact with the surface of mold 80 as they are brought out of contact with relative movement. First and second continuous edge segments 53 and 54 connecting the first and second points 51, 52 or end points of the first and second sets of points 51', 52' on opposite sides of the axis 56 will correspond to the width of the stylus 59 in the plane of the surface of the tool 80 as the stylus 59 is moved into and out of the plane, and the variable depth of cavity 57 perpendicular to the substantially planar surface of the tool along the axis 56 will correspond to the depth of penetration of the stylus 59 into the tool 80 along axis 56.

In further accordance with the invention, the surface of cavity 57 extending below the surface of tool 80 which may be used to form the integral spacer dots does not correspond to a perfect hemisphere shape (i.e., such surface will not be equidistant from the mid-point of the axis between the intersections of the first and second points 51, 52 or sets of connected points 51', 52' and the axis), as formation of a perfect hemisphere shape would be difficult to efficiently and reliably achieve by such mold engraving process. Such a perfect hemisphere shape would require an exact correspondence of the stylus 59 leading edge 58 or 58' shape, the rate of movement of the tool 80, and the rate and depth of penetration of the stylus 59. Most efficiently, such mold cavity may be formed by moving a cutting stylus into and out of a cylinder surface as the cylinder rotates, particularly favoring the formation of elongate shaped cavity peripheries (i.e., where the cavity width and cavity length are not equal), and corresponding elongated spacer dots base cross sections. In particular, it is preferred to have length to width ratios between 0.5 and 5.0 for the base of spacer dots in some embodiments, as it has been shown that this range of aspect ratios results in spacer dots that are compressible and durable and are easily manufactured into a molding roller.

Preferably, the cavities of mold 80 are cut using an engraving process using a diamond tool. Diamond tooling can be utilized to achieve the surface quality and roughness characteristics required for the creation of optical features. The precisely shaped and polished diamond tooling can be engaged with a cylindrical surface using any one of a variety of techniques, to either remove, shape or form the material on the cylindrical surface. While diamond tooling is expensive, it is preferred to more common and less expensive alternative tool materials. Such alternative tool materials, such as carbide or high-speed steel, e.g., may not be capable of producing optical quality features due to the relatively large grain size of the materials. This large grain size results in microchips along the cutting edges that will produce a surface with unacceptable roughness properties, thereby not meeting the requirements for a surface having optical utility. In order to produce optical quality features directly in a cylinder, the features can be cut, formed, scribed, ruled or otherwise created using a diamond tool or stylus.

The cylindrical surface into which the machining occurs can be either wrought or plated. In wrought form the material may compromise the entire cylindrical surface or it may be pressed or otherwise sleeved over an existing cylindrical surface made from a less expensive material. In plating, an electro-chemical process or alike is used to transfer the desired material uniformly and in a thin layer onto the outside of the cylinder surface. This plating process can also be done over a mandrel to create thin sleeve of the preferred material. As disclosed in U.S. Pat. No. 6,074,192 (Mikkelsen) this sleeve can then be patterned with the desired cavities or and then transferred to the preferred cylinder for use in replication or material transfer. This sleeve can also be removed from the mandrel and transferred to the preferred cylinder prior to forming of the desired cavities.

After forming a desired pattern of cavities, the sleeve can be removed and used as a belt in a replication or material transfer process. The sleeve can also be cut to size and used in the flat state for replication process such as injection molding or thermoforming.

The specific shape of the individual cavities created using electromechanical engraving or a fast tool servo is a function of several factors. These factors include the shape of the cutting tool and the motion of the cutting tool relative to the rotating cylinder. These engraving processes are typically quick (some can engrave more than 8,000 features per second) and have the ability to engrave large rollers. In one embodiment, the cutting is by an electro-mechanical engraving process and in another embodiment, the cutting is by a fast-tool servo process. The engraving machines can be programmed to cut specific shapes at specific locations resulting in a preset pattern of spacer dot depressions in the roller surface. For both of these engraving methods, it is preferred to have a generally circular crevice curve 55 extending to the deepest point of the depression for ease of cutting the roller.

In particular embodiments, the cutting tool stylus 59 may be shaped and translated to provide first and second continuous edge segments 53, 54 that are substantially symmetrical relative to the axis 56, as well as to provide the first and second points 51, 52 or sets of connected points 51', 52' that are substantially symmetrical relative to a line orthogonal to the axis 56. When a stylus is employed that generates a cavity periphery defined by a first set of connected points intersecting an axis in the substantially planar surface, a second opposed set of connected points intersecting the axis, and first and second continuous edge segments connecting end points of the first and second set of connected points on opposite sides of the axis, the first set of connected points intersecting an axis in the substantially planar surface may form one or more connected continuous curves, one or more connected straight line segments, or a combination of one or more continuous curves and straight line segments. The first set of connected points intersecting an axis in the substantially planar surface further may have one or more discontinuous points.

The first and second sets of connected points 51', 52' may be connected to the first and second continuous edge segments 53, 54 at discontinuous points. In such embodiment, movement of the stylus relative to the mold surface along axis 56 when forming cavities 57 may form a defined ridge in the cavity surface having a width corresponding to the first and second sets of connected points perpendicular to the axis, and spacer dots formed with such cavities will have such a corresponding defined ridge surface. Preferably, such ridge width may be between 10% and 60% of the maximum divergence of the two edge segments perpendicular to the axis, more preferably between 20 and 50% of such maximum divergence. Spacer dot having a relatively flat ridge on the top of the dot within such width ranges have been shown to provide robust spacer dot operation and ease of manufacturing.

Figure 9:
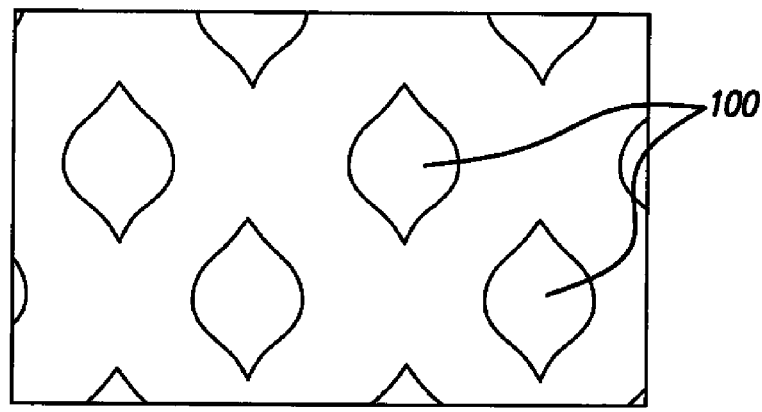
FIG. 9 is an illustration showing spacer dots with two curved surfaces from a top view.

When a stylus is employed that generates a cavity periphery in the substantially planar surface of the mold that is defined by a first point intersecting an axis in the substantially planar surface, a second opposed point intersecting the axis, and curvilinear first and second continuous edge segments connecting the first and second points, the surface of the cavity extending below the planar surface may be formed by the two intersecting convex surfaces extending from the curvilinear first and second continuous edge segments. The intersecting convex surfaces may meet at a ridgeline, such that the spacer dots formed in such a cavity may be likened to the shape of half an American football, cut along its long direction. This shape is also preferred because it is easily manufacturable and performs well. The first and second continuous edge segments may be connected at the axis at discontinuous points, which may result from the use of a stylus with a sharp point tip 58 such as shown in FIG. 11, or may be connected to form a continuous curve (e.g., where a stylus with a rounded tip is employed). An illustration in FIG. 9 shows a top down view of similar spacer dots 100 that have two curved surfaces beginning and ending at opposed points, where the two surfaces come together at a central ridge line (not shown).

FIGS. 12*a-c* through 14*a-c* illustrate three representative spacer dot shapes that may be obtained in accordance with the present invention. FIG. 12*a-c* represent cross-sectional, perspective, and top views of a spacer dot molded from a cavity formed with a stylus similar to that illustrated in FIG. 10. FIG. 13*a-c* represent cross-sectional, perspective, and top views of an American football-shaped spacer dot molded from a cavity formed with a stylus similar to that illustrated in FIG. 11. FIG. 14*a-c* represent cross-sectional, perspective, and top views of a spacer dot molded from a cavity formed with a stylus similar to that illustrated in FIG. 11, but with a flattened tip, generating a flattened ridge along the length of the spacerdot. It will be appreciated that a great variety of spacer dot shapes are possible depending upon stylus shape. The desired spacer dot shape selection may be dependent on a number of considerations, for example, the method used for manufacturing, the size of the object used to deform the cover sheet, the desired size of the dots, the flexible cover sheet material, and the number of activations of the device over its useable lifetime. For ease of manufacturing the flexible sheet, a stylus is preferably selected which results in a cavity 57 providing formed dot 50 with a base (where it is connected to the sheet 16) having the maximum size of the spacer dot to facilitate the extraction of the shaped material from the mold.

The flexible cover sheet having the integral compressible spacer dots is preferably constructed from a polymer. In certain embodiments, a transparent flexible cover sheet may be desired, particularly in combination with touch screen devices comprising transparent substrates. A transparent polymeric material may provide high light transmission properties, is inexpensive and a sheet of polymeric material can easily be formed with integral compressible spacer dots. Suitable polymer materials include polyolefins, polyesters, polyamides, polycarbonates, cellulosic esters, polystyrene, polyvinyl resins, polysulfonamides, polyethers, polyimides, polyvinylidene fluoride, polyurethanes, polyphenylene-sulfides, polytetrafluoroethylene, polyacetals, polysulfonates, polyester ionomers, and polyolefin ionomers. Polycarbonate polymers have high light transmission and strength properties. Copolymers and/or mixtures of these polymers can be used.

Polyolefins particularly polypropylene, polyethylene, polymethylpentene, and mixtures thereof are suitable. Polyolefin copolymers, including copolymers of propylene and ethylene such as hexene, butene and octene can also be used. Polyolefin polymers are suitable because they are low in cost and have good strength and surface properties and have been shown to be soft and scratch resistant.

The polymeric materials used to make the flexible transparent cover sheet in preferred embodiments of this invention preferably have a light transmission greater than 92%. A polymeric material having an elastic modulus greater than 500 MPa is suitable. An elastic modulus greater than 500 MPa allows for the integral compressible spacer dots to withstand the compressive forces common to touch screens. Further, an elastic modulus greater than 500 MPa allows for efficient assembly of a touch screen as the dots are tough and scratch resistant.

CIE is used to measure the native color of transmitted light. The colorimetry term a* is a measure of the redness or greenness and is expressed as single number, which is positive if the color is red and negative if the color is green. Similarly, yellowness or blueness is expressed by b*, which is positive for yellow and negative for blue. The larger the absolute value is for the a* and b*, the more colored the film is. The a* and b* values of films are typically measured using a CIElab colorimeter with an 1964 observer and a D65 illuminate. When a transparent touch screen is desired, a polymeric film with integral spacer dots preferably has a b* value of between −0.5 and −2.3. It has been found that observers (to displays or static images) prefer a blue-white to a yellow white. Using a film with a b* value of between −0.5 and −3.0 with an underlying display gives the display a blue-white coloration that is pleasing to the typically observer to the touch screen and display.

A spacer dot integral to the flexible cover sheet significantly reduces unwanted reflection from an optical surface such as those present in prior art touch screens that utilize polymer beads. An integral spacer dot also provides for superior durability as the dot location is fixed in the flexible cover sheet of the invention and is not subject to movement during vibration or extended use. The integral compressible spacer dots of the invention preferably have heights between 2 and 100 micrometers, more preferably between 2 and 50 micrometers, and most preferably between 10 and 50 micrometers, although shorter or taller spacer dots might be desired in some applications. The height of the spacer dot should put enough distance between the top of the spacer dot and the conductive coating on the substrate so that inadvertent electrical contact between conductive coating on the substrate and the conductive coating on the flexible sheet can be avoided, at least when no touch is applied to the touch screen. In particular, the height should be at least somewhat greater than the size of possible asperities or other defects in the conductive coating(s) that could potentially bridge the gap if the spacer dots were not tall enough. In general, larger height of the spacer dots means a lower probability of inadvertent electrical contact and a higher actuation force. A height less than 10 micrometers, and in particular less than 2 micrometers, may not provide sufficient spacing for the two conductive layers resulting in false actuation. A height greater than 50 micrometers, and in particular greater than 100 micrometers, separating the layers may require too high a compression force to connect the two conductive layers and thus may be problematic.

A desired maximum diameter for the spacer dots generally depends on their heights, so that the ratio of height to diameter is often the relevant quantity, although the absolute value of the diameter may also be important. Dots having a smaller diameter may be less visible to a user. Dots having a smaller diameter may also lead to better electronic performance of the touch panel due to less total area coverage of the spacer dots. Very large dots may decrease touch screen resolution and/or increase the activation force. In illustrative cases, spacer dot maximum diameters may be in the range of 1 to 60 micrometers, although smaller or larger spacer dots might be desired in some applications. In some embodiments, the spacer dots preferably have height to width ratios of between 0.5 and 3.0. It has been found that this range of aspect ratios enables long lasting touch screen spacer dots that are compressible and durable.

Figure 7:
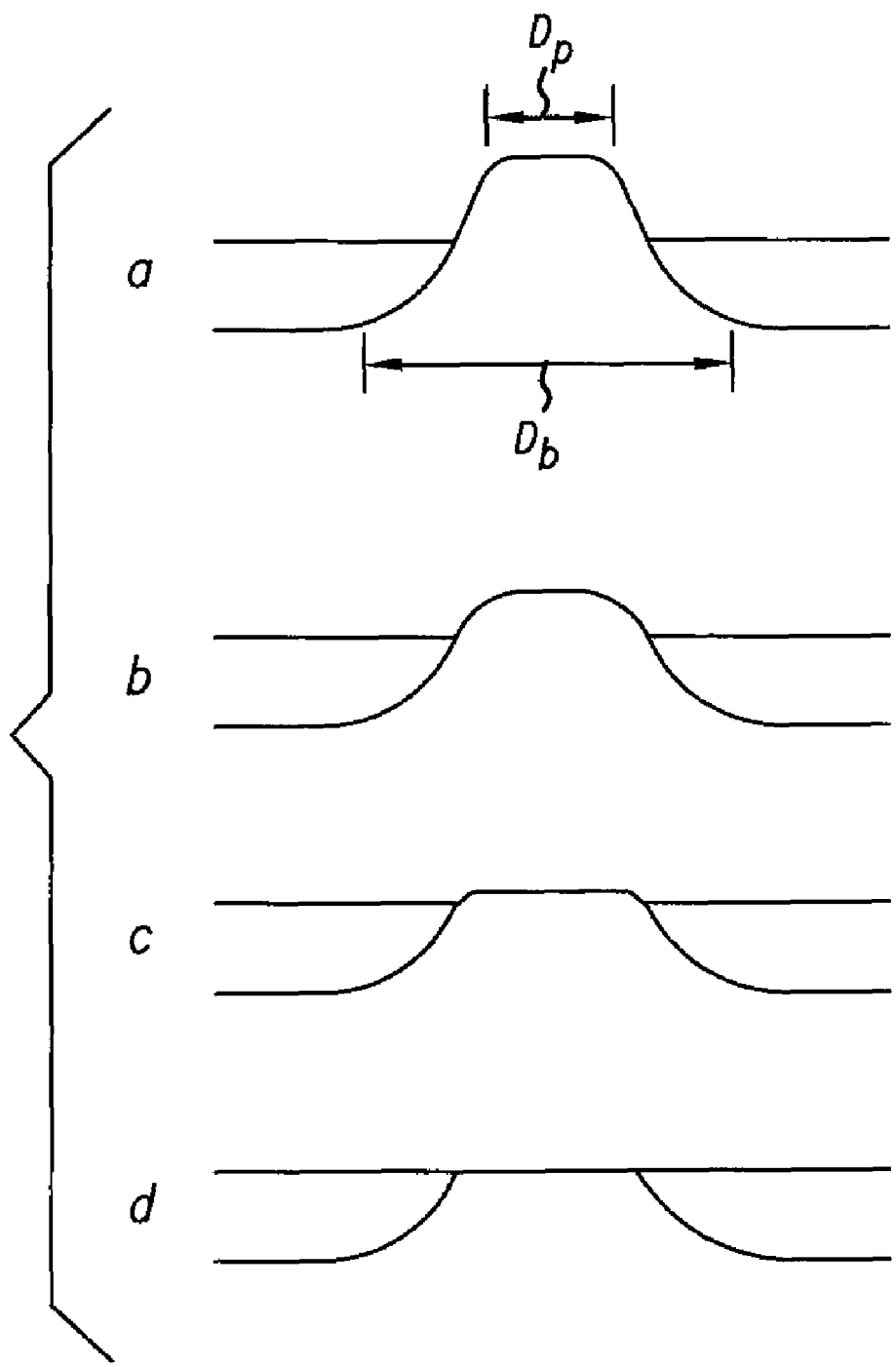
FIG. 7 is a diagram illustrating the compression of an integral spacer dot.

Referring to FIG. 7, the profile of a truncated conical spacer dot with a base diameter $D_b$ that is 75% larger than the peak diameter $D_p$ has been shown to provide an excellent compression profile allowing moderate levels of compressive force applied by the user to activate the touch screen. The base diameter being 75% larger than the peak diameter provides mechanical toughness, reduces dot wear and provides for over 1 million actuations before a 5% loss in height. A suitable material for the compressive dot illustrated in FIG. 7 is a blend of polyester and polycarbonate where the polycarbonate is present in the amount of 10% by weight of the polyester. Similar performance may be obtained though use of an integral spacer dot formed in accordance with the present invention, wherein the dot has a maximum width $D_b$ and a flat ridge of width $D_p$.

The integral compressible spacer dots preferably are spaced apart by a distance of greater than 0.25 millimeter, more preferably greater than 1 millimeter. Spacing less than 0.25 millimeter may require compressive forces that are too high to achieve contact between the two conductive layers. The polymer and dot profile used for the flexible cover sheet with integral compressible spacer dots according to this invention preferably provide for elastic deformation of greater than 1 million actuations. Elastic deformation is the mechanical property of the spacer dot to recover at least 95% of its original height after an actuation. High-quality touch screens are also required to have a consistent actuation force over the useful lifetime of the device. Spacer dot fatigue can result in increasing actuation forces over the lifetime of the device, resulting in scratching of the surface of the touch screen and user frustration.

The size, shape, height, locations and spacing of compressible spacer dots can be chosen to meet the pressure and reliability usage specification of a particular application. The locations may form a pattern or may be random. Having the spacer dots vary in shape and/or spacing creates a touch screen that has varying levels of sensitivity, accuracy, and durability across the touch screen to tailor each area of the touch screen to its application. For example, the profile of the embossing can vary to complement a variety of flexible cover sheet materials so as to maximize the lifetime, clarity, and physical properties of the flexible cover sheet. In certain embodiments, it may desirable to size and position the integral compressible spacer dots in a pattern that establishes at least one of differentiated minimum required activation forces and differentiated durability for selected areas of the touch screen as described in copending, commonly assigned USSN 10/988,340 the disclosure of which is incorporated by reference herein.

To further improve the utility and performance of the flexible cover sheet with integral compressible spacer dots, the addition of layered inorganic particulates can be added to the polymeric material. The addition of layered organic particulates can provide a significant improvement in the elastic deformation of the polymer spacer dots. Further, the addition of inorganic layered particulates can be used to increase the Tg of the polymer spacer dots allowing for a wider performance range with respect to temperature. To obtain the elastic deformation and Tg improvements, the polymer may be provided with between 1 and 5% weight addition of an inorganic layered particle having an aspect ratio of at least 10 to 1, a lateral dimension of between 0.01 µm and 5 µm, and a vertical dimension between 0.5 nm and 10 nm.

The layered particle materials suitable for this invention can comprise any inorganic layered materials in the shape of plates with significantly high aspect ratio. As used herein, "plate" means a three dimensional shape having two dimensions of the same size scale and a third dimension having a substantially smaller scale. For example, the length and width of a plate are of comparable size but orders of magnitude greater than the thickness of the plate.

However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FEOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.05}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3$—$H_2O$, $MnHAsO_4$—$H_2O$, $Ag_6Mo_{10}O_{33}$ and the like.

Suitable layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (see, for example, the textbook: "An introduction to clay colloid chemistry," by H. van Olphen, John Wiley & Sons Publishers). Typical phyllosilicates with ion exchange capacity of 50 to 300 milliequivalents per 100 grams are suitable. Suitable layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Suitable smectite clays include montmorillonite, hectorite and hydrotalcites, because of commercial availability of these materials.

The aforementioned smectite clay can be natural or synthetic. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the smectite clay particles should have a lateral dimension of between 0.01 µm and 5 µm, and preferably between 0.05 µm and 2 µm, and more preferably between 0.1 µm and 1 µm. The thickness or the vertical dimension of the clay particles can vary between 0.5 nm and 10 nm, and preferably between 1 nm and 5 nm. The aspect ratio, which is the ratio of the largest and smallest dimension of the clay particles should be between 10:1 and 1000:1 for this invention.

The aforementioned limits regarding the size and shape of the particles are to ensure adequate improvements in some properties of the nanocomposites without deleteriously affecting others.

"Nanocomposite" shall mean a composite material wherein at least one component comprises an inorganic phase, such as a smectite clay, with at least one dimension in the 0.1 to 100 nanometer range. For example, a large lateral dimension may result in an increase in the aspect ratio, a desirable criterion for improvement in mechanical and barrier properties. However, very large particles can cause optical defects due to deleterious light scattering, and can be abrasive to processing, conveyance and finishing equipment as well as to other components.

The concentration of smectite clay in the polymer material can vary as per need; however, it is preferred to be ≦10% by weight of the binder. Significantly higher amounts of clay can impair physical properties of the optical component by rendering it brittle, as well as difficult to process. On the other hand, too low a concentration of clay may fail to achieve the desired optical effect. The clay concentration may be maintained between 1 and 10% and preferably be between 1.5 and 5% for optimum results.

The smectite clay materials, generally require treatment by one or more intercalants to provide the required interlayer swelling and/or compatibility with the matrix polymer. The resulting interlayer spacing is critical to the performance of the intercalated layered material in the practice of this invention. As used herein the "interlayer spacing" refers to the distance between the faces of the layers as they are assembled in the intercalated material before any delamination (or exfoliation) takes place. The clay materials generally include interlayer or exchangeable cations such as Na+, Ca+2, K+, Mg+2 and the like. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the smectite clays are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10 and more preferably between 20:80 and 80:20.

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

The swelling agent or intercalant can be an organic material preferably comprising a hydrophilic component, and more preferably also comprising an oleophilic component. It is believed that the hydrophilic component participates in intercalation and the oleophilic component participates in compatibilization of the smectite clay in a suitable matrix or binder polymer. The aforesaid organic material can comprise a surfactant, a block co-polymer and/or an ethoxylated alcohol. In one embodiment, the aforesaid organic material is a block copolymer or an ethoxylated alcohol, similar to those disclosed in U.S. Pat. Nos. 4,739,007; 4,810,734; 4,894,411;

5,102,948; 5,164,440; 5,164,460; 5,248,720; 5,854,326; and 6,034,163 incorporated herein by reference. "Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5-line 23, col. 7).

The block copolymers are amphiphilic and have a hydrophilic and an oleophilic component. Further, the block copolymers can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One class of polymeric components that is useful for the hydrophilic component is poly (alkylene oxides) such as poly(ethylene oxide). The term poly(alkylene oxides) as used herein includes polymers derived from alkylene oxides such as poly(ethylene oxides) including mixtures of ethylene and propylene oxides. The most suitable is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly(ethylene oxides) including mixtures of ethylene and propylene oxides. The most suitable is poly(ethylene oxide), mainly because of its effectiveness, its commercial availability in a range of molecular weights and chemistries affording a wide latitude in the synthesis of the block copolymers.

Poly(ethylene oxides) are well known in the art and are described in, for example U.S. Pat. No. 3,312,753 at col. 4. Useful (alkylene oxide) block contains a series of interconnected ethyleneoxy units and can be represented by the formula:

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly(vinylpyrrolidone), poly(vinyl alcohol), polyacrylamides, polyacrylonitrile, polysaccharides and dextrans.

The oleophilic component of the block of the polymers useful in the present invention can also be selected from many common components. The oleophilic component is characterized in that it is at least partially miscible in the binder polymer, and/or interacts with the binder polymer, for example, through transesterfication. In the case of a polyester binder, the oleophilic block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; derivatives of lysine; and derivatives of glutamic acid.

Other useful oleophilic components can be derived from α, β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid; polyglycolic acid; polyhydroxybutyric acid; derivatives of polylysine; and derivatives of polyglutamic acid, polyolefins, polystyrene, polyacrylates, and polymers of α,β-ethylenically unsaturated monomers, such as olefins, styrenics and acrylates. Suitable components comprise polyester, polycaprolactone, polyamide, and polystyrene, because of their effectiveness in the present invention and compatibility with a wide range of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A matrix compatible block comprises 50 to 500 monomer repeat units of caprolactone with a matrix polymer of polyester. Another matrix compatible block comprises 25 to 100 monomer repeat units of ethylene with a matrix polymer of polyethylene. The molecular weight ranges are chosen to ensure ease of synthesis and processing under a variety of conditions.

Ethoxylated alcohols are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26-50 carbon range.

The relative efficiency of the hydrophilic and oleophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10-90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be reduced after dispersion.

The smectite clay and the intercalant, preferably the block copolymer and/or the ethoxylated alcohol, can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying.

Figure 8:
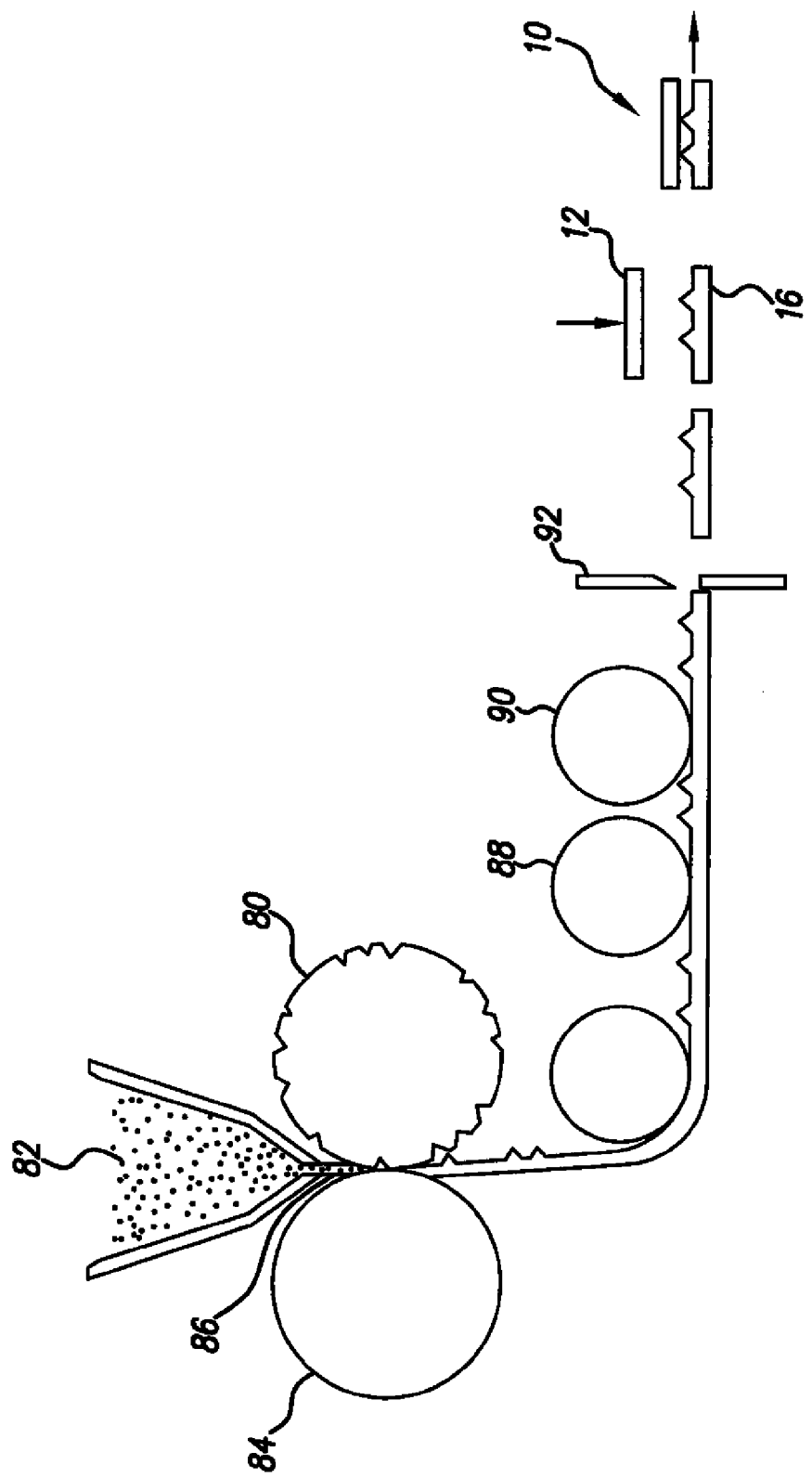
FIG. 8 is a schematic diagram illustrating one method of making a touch screen according to the present invention.

Referring to FIG. 8, in a preferred embodiment of the present invention, the integral spacer dots and flexible cover sheet are injection roll molded as a single unit. In the injection roll molding process a polymer 82 is heated above its melting point, and is injected under pressure into a nip 86 formed by a patterned roller 80 and an elastomer covered backing roller 84 in direct contact with the patterned roller 80. The patterned roller 80 has a pattern of cavities for forming the integral spacer dots. As the polymer is injected into the nip 86, some of the melted polymer fills the cavities of the patterned roller to form the integral spacer dots and the balance of the polymer is squeezed into a flat sheet having the integral spacer dots. After the integral spacer dots and flexible cover sheet have been formed, the flexible cover sheets with integral spacer dots are mechanically released from both of the rollers. Patterned roller mold 80 in such embodiment may be formed with spacer dot mold cavities by methods described above.

A conductive layer is then applied 90 on the substantially planar surface of the flexible cover sheet, such that the conductive coating preferably does not coat or deposit into the peaks of the spacer dots. A low viscosity conductive material may be efficiently flowed into the spaces between the spacer dots, leaving the peaks exposed. The conductive material viscosity in such embodiment is preferably less than 4 mPa·sec. Conductive material coated on the peaks of the spacer dots may be scraped off. In a further embodiment, the peaks of the spacer dots and/or the area between the spacer dots may be treated 88 with a high energy treatment such as CDT (corona discharge treatment) or GDT (glow discharge treatment) to provide a surface energy difference between the peaks of the spacer dots and the space between the spacer dots allowing for differential conductive solution wetting between the peaks of the spacer dots and the space between the spacer dots. The peaks may be treated by CDT or GDT by directing the high energy perpendicular to the surface of the peaks as is typical with CDT or GDT surface treatment. Further, the CDT or GDT treatment may be directed at the spacer dots at an angle greater than 15 degrees from the perpendicular case that also allows for differential energy treatment of the spacer dots. A conductive coating solution may then be applied 90 to the flexible cover sheet such that the conductive coating flows off of the peaks of the dots and into the spaces between the dots, leaving the peaks of the spacer dots free of conductive coating.

Suitable coating methods including curtain coating, roll coating and spin coating, slide coating, ink jet printing, patterned gravure coating, blade coating, electro-photographic coating and centrifugal coating, sputtering, and vapor deposition may be used to apply the conductive coating. In a specific embodiment, the conductive layer on the flexible sheet may comprise a grid pattern that lies between the spacer dots. The grid lines in such embodiment are preferably 50 to 96% of the average separation distance of the spacer dots. By having the conductive layer in a grid around the spacer dots, the spacer dots are not accidentally fully coated by a conductive layer that would be applied over the entire flexible sheet. This reduces shorting and will improve yield. This may also simplify the electronics around the touch screen to determine the touch location because the conductive pattern is in the form of a grid instead of a flat field. The coating is then dried or cured to form the conductive layer. The conductive coating may have a sheet resistivity of between 100 and 600 ohms/square. The sheet resistivity may be varied by adjusting the thickness of deposition.

In preferred embodiments, the conductive layer is transparent, and may be formed, e.g., from materials which include indium tin oxide, antimony tin oxide, electrically conductive polymers such as substituted or unsubstituted polythiophenes, substituted or unsubstituted polypyrroles, single-wall carbon nanotubes, and substituted or unsubstituted polyanilines. Preferred electrically conducting polymers for the present invention include polypyrrole styrene sulfonate (referred to as polypyrrole/poly (styrene sulfonic acid) in U.S. Pat. No. 5,674,654), 3,4-dialkoxy substituted polypyrrole styrene sulfonate, and 3,4-dialkoxy substituted polythiophene styrene sulfonate. The most preferred substituted electronically conductive polymers include poly(3,4-ethylene dioxythiophene styrene sulfonate).

Finally, the web of flexible cover sheet material with integral spacer dots and conductive coating is cut 92 into individual cover sheets 16 and applied to a substrate 12 of a touch screen 10. Touch screens in accordance with the invention may be used in conjunction with any flat panel display or lamp, including but not limited to OLED and liquid crystal display devices. Accordingly, it is further contemplated that the flexible cover sheet may be cut into the desired size for application to an LCD or OLED flat-panel display or other OLED device.

Figure 5:
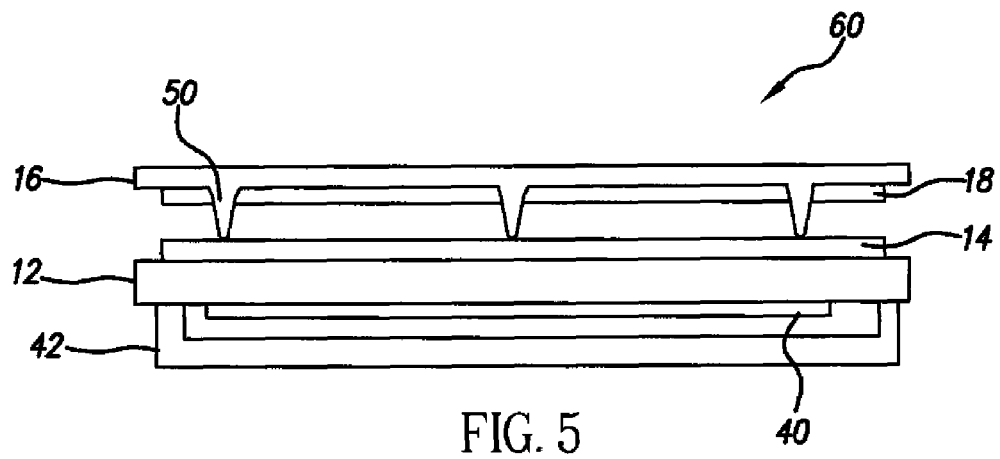
FIG. 5 is a side view of a resistive touch screen of the present invention integrated with a bottom emitting flat-panel display.
Figure 6:
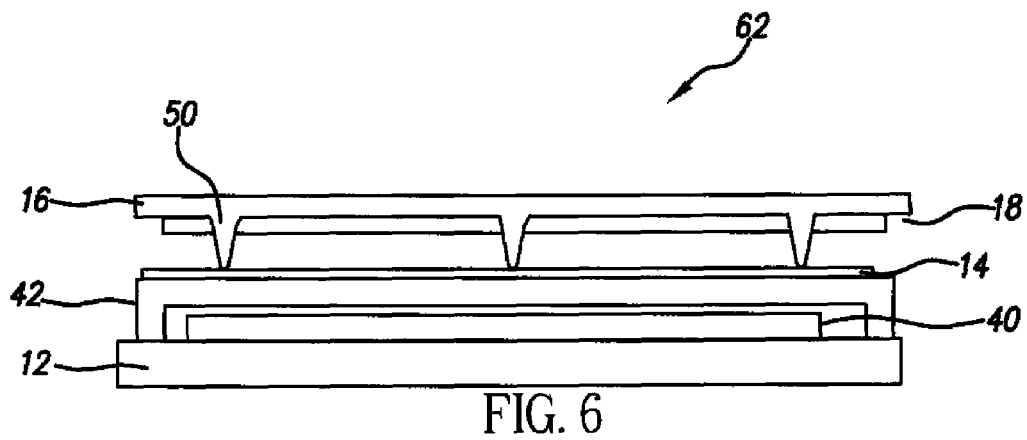
FIG. 6 is a side view of a resistive touch screen of the present invention integrated with a top emitting flat-panel.

Referring to FIGS. 5 and 6, e.g., the touch screen of the present invention can be integrated into a flat-panel display by using either the cover or the substrate of the flat-panel display as the transparent substrate 12 of the touch screen. The substrate may be rigid or flexible. The flat-panel display may emit light through a transparent cover or through a transparent substrate. As shown in FIG. 5, a flat-panel organic light emitting diode (OLED) display with an integrated touch screen 60 includes a substrate 12, OLED materials 40 and encapsulating cover 42 for the OLED display. On the opposite side of the substrate 12, the touch screen includes the first conductive layer 14 and the flexible transparent cover sheet 16 having a second conductive layer 18 and integral compressible spacer dots 50. The flat panel display device may also be a liquid crystal display device.

As shown in FIG. 6, an OLED display with an integrated touch screen 62 includes a substrate 12, OLED materials 40, and an encapsulating cover 42 for the OLED display. On the opposite side of the encapsulating cover 42, the touch screen includes the first conductive layer 14 and the flexible transparent cover sheet 16 having a second conductive layer 18 and integral compressible spacer dots 50. In both FIGS. 5 and 6, the cover or substrate of the OLED display may be flexible so that a completely integrated, flexible display and touch screen are realized. The flexible sheet may be provided with a pressure sensitive adhesive opposite the spacer dots to adhere the flexible sheet to a device.

In a further embodiment, the touch screen may also include a visible grid printed thereon. This grid may help users with accurate placement of the stylus on the touch screen increasing accuracy of the touch screen. It may also be used to help facilitate alignment during the manufacturing process. The grid may only be in a section of the display, such as the edges or the menu areas, or may be on the entire surface.

In a specific embodiment, the flexible sheet may comprise 2 or more layers. For example, an oriented film my be used which then has a layer comprising integral spacer dots applied on the film by extrusion roll molding or another method. This allows the use of oriented films in the flexible sheet providing stiffness, durability, and scratch resistance. Preferred oriented polymers include polyester (such as ethylene terephthalate and polyethylene napthalate), and oriented polyolefin such as polyethylene and polypropylene. In other example, the flexible sheet may have multiple layers such that as the top surface of the flexible sheet opposite the integral spacer dots is damaged, scratched, or worn out, one may strip off one of the layers of the flexible sheet revealing a new surface. The flexible sheet may have many layers to peel off therefore extending the life of the touch screen.

Adhesives may be used to laminate the flexible sheets and touch screens of the present invention to another film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. In some embodiments, the pressure sensitive adhesives are on the flexible sheet on the side opposite the spacer dots. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, the adhesives can contain additives such as tackifiers, plasticizers, fillers, antioxidants, stabilizers, pigments, diffusing particles, curatives, and solvents. When a laminating adhesive is used to adhere a touch screen of the present invention to another surface, the adhesive composition and thickness are preferably selected so as not to interfere with the optical properties of the touch screen layers. For example, when laminating additional layers to a touch screen wherein a high degree of transmission is desired, the laminating adhesive should be optically clear in the wavelength region that the touch screen is designed to be transparent in.

In addition to the films, coatings, and additives noted above, the component layers of the touch screens of the present invention may also comprise other materials or additives as are known to the art. Such materials include, e.g., binders, coatings, fillers, compatibilizers, surfactants, antimicrobial agents, foaming agents, reinforcers, heat stabilizers, impact modifiers, plasticizers, viscosity modifiers, and other such materials.

In a specific embodiment, a 100 micrometer thick polycarbonate transparent flexible cover sheet having integral polycarbonate spacer dots may be formed using injection roll molding employing a cylinder mold having approximately 20 micrometer wide by 30 micrometer long by 10 micrometer deep half American football-shaped cavities formed by electro-mechanical machining. A 20 cm by 20 cm sheet cover sheet containing the spacer dots is coated with a conductive polymer having a sheet resistivity of 375 ohms/square using a gravure coating process with a scraping blade contacting the spacer dots to yield a continuous conductive coating in the area not occupied by the integral spacer dots.

The spacer dot size and the pattern depth determine the number of features in the roller per area. Larger diameters and deeper patterns require fewer numbers of features in a given area. Therefore the number of features is inherently determined by the spacer dot size and the pattern depth. The spacer dots of the invention may also be manufactured by vacuum forming around a pattern, extrusion molding the dots and embossing dots in a polymer web. While these manufacturing techniques do yield acceptable dots, extrusion roll molding polymer onto a patterned roller allows for the flexible cover sheet with spacer dots of the invention to be formed into rolls thereby lowering the manufacturing cost. Injection roll molding has been shown to efficiently replicate the desired complex dot geometry in an efficient manner.

The entire contents of the patents and other publications referred to in this specification are incorporated herein by reference.

The invention has been described in detail with particular reference to certain preferred embodiments thereof, but it will be understood that variations and modifications can be effected within the spirit and scope of the invention. For example, although the invention has been described with reference to a touch screen wherein the touch is applied to the cover sheet, in the case where both the substrate and the cover sheet are flexible, the touch could be applied to the substrate.

PARTS LIST 10 resistive touch screen
11 substrate
12 substrate
13 finger
14 first conductive layer
16 cover sheet
18 second conductive layer
20 spacer dots
40 OLED materials
42 encapsulating cover
50 integral compressible spacer dots
51 first point
51' first set of connected points
52 second point
52' second set of connected points
53 first continuous edge segment
54 second continuous edge segment
55 crevice curve
56 axis
57 cavity
58 stylus point
58' stylus leading edge
59 stylus
60 OLED display with integrated touch screen
62 OLED display with integrated touch screen
80 patterned mold
82 polymer
84 backing roller
86 nip
88 coating step
90 application step
92 cut step
100 spacer dots

The invention claimed is:

1. A touch screen comprising:
a) a substrate;
b) a first conductive layer located on the substrate;
c) a flexible sheet comprising a substantially planar surface and integral compressible spacer dots formed thereon, each integral compressible spacer dot having a base closest to the substantially planar surface and a peak furthest from the substantially planar surface; and
d) a second conductive layer located on the substantially planar surface of the flexible sheet, the peaks of the integral compressible spacer dots extending beyond the second conductive layer located on the substantially planar surface;
wherein the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, and further wherein each integral compressible spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, the height increasing from the first point or set of connected points intersecting the axis to an intermediate point along the axis and decreasing from an intermediate point along the axis to the second point or set of connected points intersecting the axis, and wherein the surface of the spacer dot extending above the base cross section is not equidistant from the mid-point of the axis between the intersections of the first and second points or sets of connected points and the axis.

2. The touch screen of claim 1, wherein the first and second continuous edge segments are substantially symmetrical relative to the axis.

3. The touch screen of claim 2, wherein the first and second points or sets of connected points are substantially symmetrical relative to a line orthogonal to the axis.

4. The touch screen of claim 1, wherein the base cross section in the substantially planar surface of the flexible sheet is defined by a first set of connected points intersecting an axis in the substantially planar surface, a second opposed set of connected points intersecting the axis, and first and second continuous edge segments connecting end points of the first and second set of connected points on opposite sides of the axis.

5. The touch screen of claim 4, wherein the first set of connected points intersecting an axis in the substantially planar surface form one or more connected continuous curves.

6. The touch screen of claim 4, wherein the first set of connected points intersecting an axis in the substantially planar surface form one or more connected straight line segments.

7. The touch screen of claim 4, wherein the first set of connected points intersecting an axis in the substantially planar surface has one or more discontinuous points.

8. The touch screen of claim 4, wherein the first and second sets of connected points are connected to the first and second continuous edge segments at discontinuous points.

9. The touch screen of claim 8, wherein the width of the first and second sets of connected points perpendicular to the axis is between 10% and 60% of the maximum divergence of the first and second continuous edge segments perpendicular to the axis.

10. The touch screen of claim 8 wherein the width of the first and second sets of connected points is between 20% and 50% of the maximum divergence of the two edge segments.

11. The touch screen of claim 1, wherein the base cross section in the substantially planar surface of the flexible sheet forms an elongated shape.

12. The touch screen of claim 1, wherein the base cross section in the substantially planar surface of the flexible sheet is defined by a first point intersecting an axis in the substantially planar surface, a second opposed point intersecting the axis, and curvilinear first and second continuous edge segments connecting the first and second points, and the surface of the spacer dot extending above the base cross section is formed by the two convex surfaces extending from the curvilinear first and second continuous edge segments and intersecting above the axis.

13. The touch screen of claim 12, wherein the first and second continuous edge segments are connected at the axis to form a continuous curve.

14. The touch screen of claim 1, wherein the substrate, first conductive layer, flexible cover sheet, and second conductive layer are transparent.

15. The touch screen of claim 1, wherein the spacer dots have heights between 2 and 100 micrometers.

16. The touch screen of claim 1, wherein the spacer dots have heights between 10 and 50 micrometers.

17. The touch screen of claim 1, wherein the flexible sheet comprises one of the group including polymer, polyolefin polymer, polyester, polycarbonate, and a blend of polyester and polycarbonate.

18. The touch screen of claim 1, wherein said spacer dots and cover sheet have a % visible light transmission greater than 92%.

19. The touch screen dots of claim 1, wherein said spacer dots have a spacing of greater than 0.25 millimeter.

20. The touch screen of claim 1, wherein said spacer dots provide elastic deformation for greater than one million actuations.

21. The touch screen of claim 1, wherein said spacer dots comprise polymer with between 1 and 5% weight addition of an inorganic particle having an aspect ratio of at least 10 to 1, a lateral dimension of between 0.01 µm and 5 µm, and a vertical dimension between 0.5 nm and 10 nm.

22. The touch screen of claim 1, wherein said flexible cover sheet is further provided with a pressure sensitive adhesive opposite said spacer dots.

23. The touch screen of claim 1, wherein the second conductive layer comprises an electrically conductive polymer.

24. The touch screen of claim 23, wherein the conductive polymer comprises one of the group including polypyrrole styrene sulfonate, 3,4-dialkoxy substituted polypyrrole styrene sulfonate, and 3,4-dialkoxy substituted polythiophene styrene sulfonate, poly(3,4-ethylene dioxythiophene styrene sulfonate.

25. The touch screen of claim 23, wherein the conductive polymer comprises polythiophine.

26. The touch screen claimed in claim 1 wherein the substrate is flexible.

27. The touch screen claimed in claim 1 wherein the substrate is rigid.

28. The touch screen of claim 1 wherein the touch screen substrate is a cover or substrate of a flat-panel display device.

29. The touch screen claimed in claim 28, wherein the flat-panel display device is an OLED display device.

30. The touch screen claimed in claim 28, wherein the flat-panel display device is a liquid crystal display device.

31. The touch screen of claim 1 wherein the touch screen substrate is a cover or substrate of a flat-panel lamp.

32. The touch screen claimed in claim 31, wherein the flat-panel lamp is an OLED lamp.

33. The touch screen of claim 1 wherein the spacer dots have height to width ratios of between 0.5 and 3.0.

34. The touch screen of claim 1 wherein the spacer dots have length to width ratios of between 0.5 and 5.0.

35. A method of making a resistive touch screen, comprising the steps of:
 a) providing a substrate;
 b) forming a first conductive layer on the substrate;

c) providing a flexible cover sheet comprising a substantially planar surface and integral compressible spacer dots formed thereon, each integral compressible spacer dot having a base closest to the substantially planar surface and a peak furthest from the substantially planar surface;

d) forming a second conductive layer on the substantially planar surface of the flexible cover sheet, where the peaks of the integral compressible spacer dots extend beyond the second conductive layer formed on the substantially planar surface; and e) locating the flexible cover sheet over the substrate such the first and second conductive layers are positioned towards each other and separated by the integral compressible spacer dots, whereby, when a minimum required activation force is applied to the touch screen at the location of one of the compressible spacer dots, the compressible spacer dot is compressed to allow electrical contact between the first and second conductive layers, wherein each integral compressible spacer dot comprises a base cross section in the substantially planar surface of the flexible sheet defined by a first point or set of connected points intersecting an axis in the substantially planar surface, a second opposed point or set of connected points intersecting the axis, and first and second continuous edge segments connecting the first and second points or end points of the first and second sets of points on opposite sides of the axis, wherein the spacer dot has a variable height perpendicular to the substantially planar surface along the axis, the height increasing from the first point or set of connected points intersecting the axis to an intermediate point along the axis and decreasing from an intermediate point along the axis to the second point or set of connected points intersecting the axis, and wherein the surface of the spacer dot extending above the base cross section is not equidistant from the mid-point of the axis between the intersections of the first and second points or sets of connected points and the axis.

36. A method of claim 35, wherein the flexible cover sheet comprising a substantially planar surface and integral compressible spacer dots formed thereon is formed by molding the compressible spacer dots with a cylinder mold having corresponding spacer dot depressions on the surface of the cylinder.

37. A method of claim 36, wherein the spacer dot depressions on the cylinder mold are formed by bringing a cutting stylus into and out of contact with the surface of the cylinder as the cylinder rotates to cut out the depressions.

38. The method of claim 37 wherein the spacer dot depressions have a generally circular crevice curve extending to the deepest point of the depression.

39. The method of claim 37 wherein the cutting is by an electromechanical engraving process.

40. The method of claim 37 wherein the cutting is by a fast-tool servo process.

41. The method claimed in claim 35, wherein the flexible sheet is provided as a web in a continuous roll, the integral spacer dots are molded in the continuous roll, and the sheet is cut from the roll.

42. The method claimed in claim 35, wherein the spacer dots are formed in the flexible sheet by injection roll molding.

43. The method claimed in claim 35, wherein the spacer dots are formed in the flexible sheet by applying heat and pressure to the flexible sheet by a mold including a reverse image of the spacer dots.

\* \* \* \* \*

UNITED STATES PATENT AND TRADEMARK OFFICE
CERTIFICATE OF CORRECTION

| | |
|---|---|
| PATENT NO. | : 7,397,466 B2 |
| APPLICATION NO. | : 10/987467 |
| DATED | : July 8, 2008 |
| INVENTOR(S) | : Robert P. Bourdelais et al. |

Page 1 of 1

It is certified that error appears in the above-identified patent and that said Letters Patent is hereby corrected as shown below:

Issued Patent

| Column | Line | Description of Error |
|---|---|---|
| 20 | 16 | In Claim 17, after "including" insert -- : --, therefor. |
| 20 | 42 | In Claim 24, delete "poly(3,4-ethylene" and insert -- poly 3,4-ethylene --, therefor. |
| 20 | 44 | In Claim 25, delete "polythiophine" and insert -- polythiophene --, therefor. |

Signed and Sealed this

Ninth Day of February, 2010

David J. Kappos
*Director of the United States Patent and Trademark Office*